XR  3,538,919

Patent
[11] 3,538,919

[72] Inventor Robert G. Meyer
     Aurora, Indiana
[21] Appl. No. 629,322
[22] Filed April 7, 1967
[45] Patented Nov. 10, 1970
[73] Assignee Gregory System Incorporated
     Houston, Texas
     a corporation of Colorado

[54] DEPILATION BY MEANS OF LASER ENERGY
     4 Claims, 5 Drawing Figs.
[52] U.S. Cl. .................................................. 128/398,
                                                          331/94.5
[51] Int. Cl. ................................................ A61n
[50] Field of Search ..................................... 128/23,
         303.1, 303.18, 303.19, 395—398; 331/94.5

[56]                References Cited
              UNITED STATES PATENTS
3,035,580  5/1962  Guiorguiev .................. 128/303.18

OTHER REFERENCES
Malt, " The Technology Review", Apr. 1964, pp. 25 and 26
331/94.5 Vol. 66, No. 6

*Primary Examiner* — William E. Kamm
*Attorney* — Laurence R. Brown

ABSTRACT: This application discloses a method of depilation wherein the lower portion of a hair is destroyed by metered amount of laser energy sent to the end of a fiber optics rod penetrating into the follicle. The probe is a flexible fiber optic rod of about .002 inches in diameter enclosed within a catheter and terminating in a tapered metallic tube of about .005 inches in diameter. The rod is coupled to a laser energy source for receiving a specified metered amount of energy such as the order of 40 joules per square centimeter to destroy the lower portion of a hair over a period of the order of one to two milliseconds such as obtainable from a pulsed laser source.

Patented Nov. 10, 1970

3,538,919

INVENTOR
ROBERT G. MEYER

BY

ATTORNEYS

DEPILATION BY MEANS OF LASER ENERGY

This invention relates to methods and apparatus for laser treatment which would be used for the surgical destruction of a portion of the follicle in a depilation.

An indication of the state of the art of laser treatment is contained in an article entitled "The Laser's Bright Magic" published in pages 858—881 of National Geographic, Vol. 130, No. 6 for December 1966. However, the prior art of laser treatment has not afforded methods of depilation.

The object of this invention is to provide a laser depilatory.

Thus, in accordance with this invention, the laser energy is concentrated at a specified region of a laser transmission rod terminating in a probe which penetrates the skin to reach the hair follicle. The specific means and method for carrying out this invention are described with particularity in the following specification together with further objects, features, and advantages, while making reference to the accompanying drawings, wherein.

Figure 1:
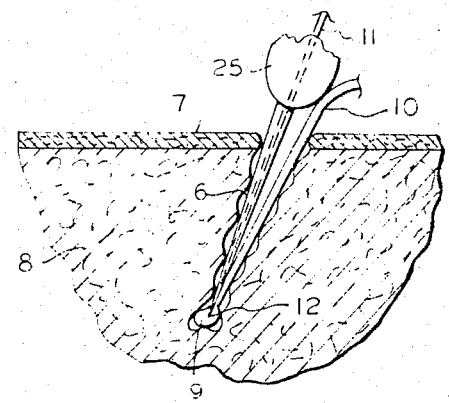
FIG. 1 is a fragmental view, partly in section, of a laser probe used for depilation.

As may be seen from FIG. 1, a laser instrument is shown with a probe 6, which penetrates the skin 7 to reach inside the follicle 9 for destruction of a portion of the follicle. As shown schematically, the probe 6 may be inserted alongside the hair 10 inside the follicle. In this illustration depilation is accomplished by inserting the probe 6 into the follicle 9 of hair 10 to terminate at the papilla, and transmitting a metered amount of laser energy through the laser beam transmitting rod 11 to destroy the tissue immediately surrounding the terminal end 12 of the laser probe 6.

Figure 2:
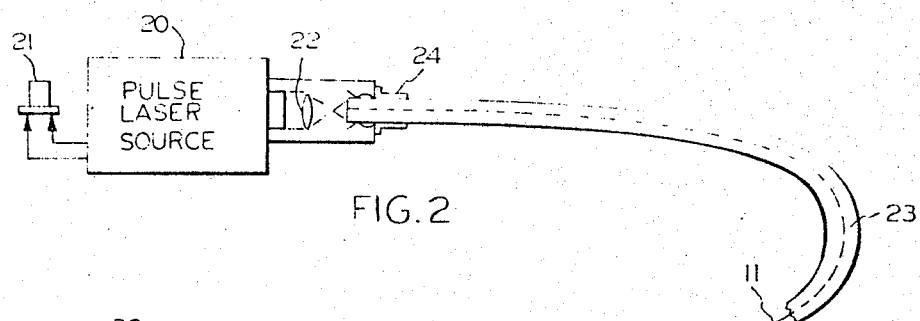
FIG. 2 is a schematic diagram of a laser system constructed in accordance with this invention to surgically treat internal tissue.

The laser system itself is somewhat conventional as shown in FIG. 2 utilizing a laser source 20 which can be a ruby, argon, or neodymium laser of the type commercially available from American Optical and other sources. As noted, the source is preferably a pulsed laser which provides a laser flash of known duration to thereby establish a known time period of energy duration upon closure of a switch such as push button 21. The duration for purposes of destroying a follicle may be in the order of 1 to 2 milliseconds. For purposes of laser depilation as afforded by this invention, the laser energy is coupled into one end of a laser transmission fiber optics rod 11 which may be, for example, a rod 11 four feet in length made of optical fibers about .002 inches in diameter with peak transmission at the laser wavelength. An optical system 22 may be used to focus the laser beam into a flat receptive end of the rod 11. The design is such that total internal reflections (TIR) are supported within the entire length of the laser transmission fiber optics rod. The fiber optics rod is flexible and for protection is covered with a catheter jacket 23 intermediate the coupling member 24 and the probe pencil member 25 at the terminal end. A coiled spring 28 restricts flexing at the joint between probe pencil 25 and the jacket 23.

Figure 3:
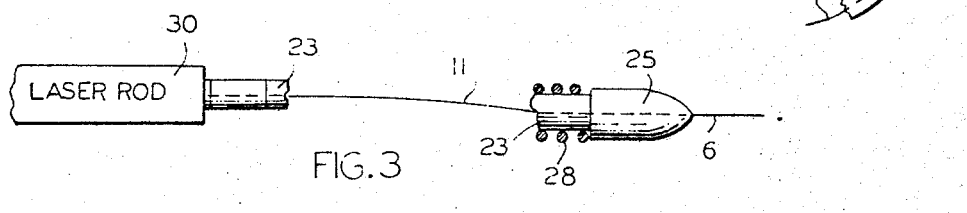
FIG. 3 is a schematic view of means of coupling laser energy to a surgical probe provided in accordance with the teachings of this invention.

Alternatively, the laser energy may be coupled without an optical system from a laser rod 30 into the end of the transmission rod 11 as shown by FIG. 3. If the laser rod 30 provides an energy of 10 joules and is 6 millimeters in diameter, the coupled energy density to the .002 inch diameter transmission rod 11 is in the order of 30 to 40 joules per square centimeter, which is in the order of energy density desired to destroy a portion of the follicle in the manner illustrated in FIG. 1. Thus, it has been found that successful depilation occurs when a laser transmitting probe of the order of .002 inches in diameter is inserted through the skin to terminate at a follicle when a density of laser energy in the order of 40 joules per square centimeter is transmitted to the terminal end of the probe for a time period in the order of 1 to 2 milliseconds.

Figure 4:
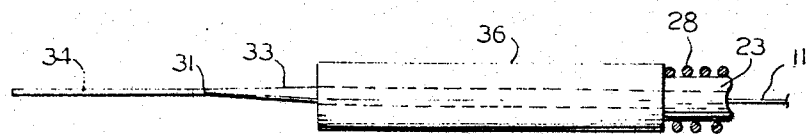
FIG. 4 is an elevation view of a probe constructed in accordance with this invention.
Figure 5:
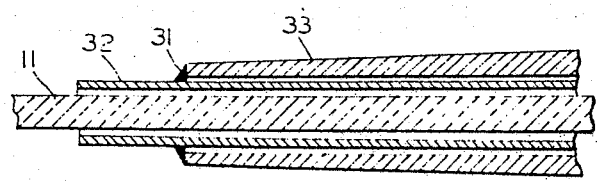
FIG. 5 is an enlarged segmental elevation view in section of the probe structure.

The structure of probe pencil 25 is shown in FIGS. 4 and 5, where FIG. 5 is an enlarged view taken about the joint 31. Thus, the .002 inch diameter glass transmission rod 11 is jacketed within a metallic tubing 32 of stainless steel for example, having an outer diameter of about .005 inch. This serves as an injection needle section 34 and furthermore shields the laser transmission rod 11 to prevent any damage to tissue in the event defects in the rod permit escape of laser energy at any position other than the terminal end. A tapered coupling section 33 couples the needle section 34 to the pencil grip head 35 into which the catheter jacket 23 is inserted and sealed and from which extends the protective coil spring 28.

It is noted that because of the intense nature of the laser beam which is transmitted through the fiber optic rod 11, it is possible to deliver sufficient energy at the end of the needle probe 34 for destruction of a portion of the follicle only in the immediate vicinity of the end of the probe. The concept allows that the laser dose required for treatment may be metered in such a way as to be established at the laser source. Although therapeutic probes for transmission of radiant energy from a source to the skin or at a position accessible through a body cavity have been known before as evidenced from the teaching of treating skin surface blemishes on page 873 of the above referenced article, and in U.S. Pat. Nos. 1,550,197 and 1,542,183, disclosing therapeutic energy transmission rods, there has heretofore been no known method or apparatus for inserting radiant energy by means of a probe to the position of the follicle for the purposes of depilation.

Accordingly, this invention provides a novel depilatory. Having therefore contributed to the advance of the state of the art, those features of novelty believed descriptive of the spirit and nature of the invention are defined with particularity in the appended claims.

I claim:

1. The method of depilation comprising in combination the step of:

inserting a laser transmitting probe in the order of .002 inches in diameter through the skin to terminate with an energy releasing end face of the probe located at the end of a follicle; confining the internal laser energy within the entire length of the probe;

transmitting a density of laser energy into said probe in the order of 40 joules per square centimeter;

pulsing the laser energy for a time period in the order of 1 or 2 milliseconds; and confining the release of said energy to said end face of the probe thereby destroying tissue only in the immediate vicinity of the follicle without providing for any return energy path through tissue.

2. The improved method of depilation comprising the steps of:

positioning a laser energy path to transmit radiant laser energy beneath the skin into a terminal region in the vicinity of a follicle;

transmitting a measured pulse of laser energy through said path to terminate in the immediate vicinity of the follicle of hair having a value in the order of 40 joules per square centimeter for a time duration in the order of a few milliseconds for depilating the hair with damage only to that tissue in the immediate vicinity of said terminal region; and confining said energy within said path for release of radiant energy into the tissue only at said terminal end.

3. The method defined in claim 2 including the steps of transmitting the laser energy into the vicinity of the follicle by means of a single optical fiber laser transmitting probe having a diameter of the order of .002 inches and providing total internal reflections to emit the entire laser energy beam at the end surface of the fiber and extending said fiber beneath the skin into a position near the papilla.

4. The improved method of depilation comprising the step of transmitting a measured quantity of laser energy into the immediate vicinity of the follicle of a hair sufficient for depilation including the step of metering said laser energy by abutting a probe of limited diameter to a laser energy conducting source of larger diameter.